United States Patent [19]

Bissot et al.

[11] Patent Number: 4,552,631

[45] Date of Patent: Nov. 12, 1985

[54] REINFORCED MEMBRANE, ELECTROCHEMICAL CELL AND ELECTROLYSIS PROCESS

[75] Inventors: Thomas C. Bissot, Newark; Stephen Li, Wilmington, both of Del.

[73] Assignee: E. I. Du Pont de Nemours and Company, Wilmington, Del.

[21] Appl. No.: 473,962

[22] Filed: Mar. 10, 1983

[51] Int. Cl.[4] .................. C25B 1/46; C25B 13/02; C25B 13/08

[52] U.S. Cl. .................. 204/98; 204/128; 204/252; 204/282; 204/296

[58] Field of Search .............. 204/98, 128, 252, 263, 204/265, 282, 296

[56] References Cited

U.S. PATENT DOCUMENTS

| | | | |
|---|---|---|---|
| 3,940,916 | 3/1976 | Grot | 57/140 R |
| 4,021,237 | 5/1977 | Grot | 204/296 |
| 4,021,327 | 5/1977 | Grot | 204/296 |
| 4,135,996 | 1/1979 | Buoy et al. | 204/98 |
| 4,272,337 | 6/1981 | Darlington | 204/98 |
| 4,323,434 | 4/1982 | Yoshida et al. | 204/98 |
| 4,349,422 | 9/1982 | Maloney | 204/98 |
| 4,356,068 | 10/1982 | Darlington | 204/296 |

FOREIGN PATENT DOCUMENTS

| | | |
|---|---|---|
| 45603 | 2/1982 | European Pat. Off. . |
| 56707 | 7/1982 | European Pat. Off. . |
| 0066127 | 12/1982 | European Pat. Off. .......... 204/296 |
| 55-110786 | 8/1980 | Japan . |
| 57-131378 | 8/1982 | Japan . |
| 57-131377 | 8/1982 | Japan . |
| 57-194268 | 11/1982 | Japan . |
| 57-194269 | 11/1982 | Japan . |

Primary Examiner—Andrew H. Metz
Assistant Examiner—Terryence Chapman

[57] ABSTRACT

A reinforced ion exchange membrane which comprises fluorinated polymer which has carboxylic functional groups, which has a hydrogen bubble release layer on the cathode-facing side thereof, and which has channels open to the outer surface of the anode-facing side thereof, is described. Precursor membrane, which may contain partially embedded sacrificial members, and from which the reinforced ion exchange membrane is made, is also described. The reinforced ion exchange membrane can be used to separate the compartments of a chloralkali cell, and such a cell operates at low voltage, high current efficiency, and low power consumption.

57 Claims, 3 Drawing Figures

REINFORCED MEMBRANE, ELECTROCHEMICAL CELL AND ELECTROLYSIS PROCESS

BACKGROUND OF THE INVENTION

Fluorinated ion exchange polymers having carboxylic acid and/or sulfonic acid functional groups or salts thereof are known in the art. One principal use of such polymers is as a component of a membrane used to separate the anode and cathode compartments of a chloralkali electrolysis cell. Such membrane can be in the form of a reinforced or unreinforced film or laminar structure.

It is desirable for use in a chloralkali cell that a membrane provide for operation at low voltage and high current efficiency, and thereby at low power consumption, so as to provide products of high purity at low cost, especially in view of today's high cost of energy. Membrane strengthened by having reinforcement therein is often required by large segments of the chloralkali industry, so as to resist damage during installation and use in cells of industrial size.

Previously known reinforced membranes for chloralkali use, having both carboxylate and sulfonate fluorinated polymer layers, reinforced with fluorocarbon polymer strands and having channels within the membrane left by removal of sacrificial threads embedded therein, provided chloralkali cell performance at acceptably good current efficiency, about 96%. However, these membranes operate at voltages now considered too high, i.e., about 3.5 volts in narrow gap cells and about 3.7 volts in zero gap cells at $3KA/m^2$ and 90° C. In an effort to improve the performance of such reinforced membrane, it has been proposed to use a gas release layer, such as a coating containing zirconium oxide or a thin sheet of asbestos paper, which is applied to the carboxylate surface (the surface facing the cathode) of the membrane. However, while this has helped to improve the voltage to about 3.3 volts in narrow gap cells and about 3.2 volts in zero gap cells, the current efficiency has been unexpectedly and unacceptably lowered to about 88–89% in both types of cell, the net result being a power consumption about the same as that before the gas release surface was applied to the carboxylate surface of the membrane.

Inasmuch as the chloralkali industry is moving toward use of zero gap and narrow gap cells so as to minimize the contribution of electrolyte resistance on total cell voltage, it is important to provide for use in such cells reinforced membrane which is adapted to operate at both low voltage and high current efficiency.

It is a principal object of this invention to provide reinforced cation exchange membrane which is especially adapted for zero-gap and narrow-gap chloralkali cells to provide for operation at high current efficiency and low voltage. Other objects will be apparent hereinbelow.

SUMMARY OF THE INVENTION

Briefly, according to the present invention, it has been found that reinforced membrane which operates at high current efficiency in both zero gap and narrow gap chloralkali cells, and which operates at low voltage by virtue of a gas release surface on the cathode-facing surface thereof, can be made if the anode-facing surface thereof has a specific surface topography which is characterized by specific ranges of "void volume" and "open area", as defined hereinafter. The invention resides in a reinforced fluorinated cation exchange polymer membrane having a hydrogen bubble release layer at the cathode-facing surface thereof in combination with the specific surface topography on the anode-facing surface thereof, which provides performance at both high current efficiency and low voltage. Such membrane provides for lower power consumption in such chloralkali cells than does membrane with a gas release surface on its cathode-facing surface but not having the specific surface topography.

More specifically there is provided in a reinforced fluorinated cation-exchange polymer membrane which is impermeable to hydraulic flow of liquid, said membrane comprising at least first and second layers of fluorinated polymer whose functional groups are —CFZ—COOM groups or —CFQ—SO$_3$M groups, where M is H, Na, K or NH$_4$, Z is F, CF$_3$ or CF$_2$Cl, and Q is F, Cl, C$_1$ to C$_{10}$ perfluoroalkyl or CF$_2$Cl, adjacent said layers being in adherent contact with one another, said first layer being of polymer whose functional groups are —CFZ—COOM groups and said second layer being of polymer whose functional groups are —CFQ—SO$_3$M groups, the improvement wherein said membrane has a hydrogen bubble release layer at the outer surface of said first layer, has voids at the outer surface of said second layer characterized by a void volume of 5 to 40% and an open area of 15 to 100%, and has reinforcement strands partially or completely embedded therein, and each said polymer with —CFZ—COOM groups has an equivalent weight of 670 to 1500 and each said polymer with —CFQ—SO$_3$M groups has an equivalent weight of 600 to 1500. It will be understood that although the invention herein is described and illustrated in reference to membrane having voids in the form of channels, the voids can also be of other configurations.

There are also provided according to the invention precursor membrane from which the cation exchange membrane is made, an electrochemical cell having said cation exchange membrane as a component part thereof, and an electrolysis process in which said cation exchange membrane is used.

DETAILED DESCRIPTION OF THE INVENTION

The reinforced membrane of the present invention is typically prepared from fluorinated polymer which has —COOR or —SO$_2$X functional groups, where R is lower alkyl and X is F or Cl, and a web of support material.

The polymers used in the instant invention are of types known in the art. These include fluorinated polymers with pendant side chains containing sulfonic acid or carboxylic acid groups or their derivatives.

The carboxylic polymers with which the present invention is concerned have a fluorinated hydrocarbon backbone chain to which are attached the functional groups or pendant side chains which in turn carry the functional groups. When the polymer is in melt-fabricable form, the pendant side chains can contain, for example, wherein Z is F, CF$_3$ or CF$_2$Cl, preferably F, t is 1 to 12, and W is —COOR or —CN, wherein R is lower alkyl. Preferably, the functional group in the side chains of the polymer will be present in terminal wherein t is 1 to 3.

By "fluorinated polymer" is meant a polymer in which, after loss of any R group by hydrolysis to ion exchange form, the number of F atoms is at least 90% of the total number of F, Cl and H atoms in the polymer. For chloralkali cells, perfluorinated polymers are preferred, though the R in any COOR group need not be fluorinated because it is lost during hydrolysis.

Polymers containing side chains, in which m is 0, 1, 2, 3 or 4, are disclosed in U.S. Pat. No. 3,852,326.

Polymers containing —(CF$_2$)$_n$COOR side chains, where n is 1 to 18, are disclosed in U.S. Pat. No. 3,506,635.

Polymers containing side chains, where Z and R have the meaning defined above and m is 0, 1, or 2 (preferably 1) are disclosed in U.S. Pat. No. 4,267,364.

Polymers containing terminal —O(CF$_2$)$_v$W groups, where W is as defined above and v is from 2 to 12, are preferred. They are disclosed in U.S. Pat. Nos. 3,641,104, 4,178,218, 4,116,888, British Pat. No. 2,053,902A, and British Pat. No. 1,518,387. These groups may be part of side chains, where V is F, CF$_3$ or CF$_2$Cl. Especially preferred are polymers containing such side chains where v is 2, which are described in U.S. Pat. No. 4,138,426 and S. Afr. Pat. No. 78/002225, and where v is 3, which are described in U.S. Pat. No. 4,065,366. Among these polymers, those with m=1 and V=CF$_3$ are most preferred. Polymers with side chains wherein V is CF$_2$Cl are disclosed in European patent publication No. 41737.

The above references describe how to make these polymers.

The sulfonyl polymers with which the present invention is concerned are fluorinated polymers with side chains containing the group wherein Q is F, Cl, a C$_1$ to C$_{10}$ perfluoroalkyl radical, or CF$_2$Cl, and X is F or Cl, preferably F. Ordinarily, the side chains will contain —OCF$_2$CF$_2$CF$_2$SO$_2$X or —OCF$_2$CF$_2$SO$_2$F groups, preferably the latter. The term "fluorinated polymer" carries the same meaning as employed above in reference to carboxylate polymers. For use in chloralkali membranes, perfluorinated copolymers are preferred.

Polymers containing the side chain where k is 0 or 1 and j is 3, 4, or 5, may be used. These are described in British Pat. No. 2,053,902A.

Polymers containing the side chain —CF$_2$CF$_2$SO$_2$X are described in U.S. Pat. No. 3,718,627.

Preferred polymers contain the side chain where X is as defined above, Y is F or CF$_3$, r is 1, 2, or 3, and R$_f$ is F, Cl, or a C$_1$ to C$_{10}$ perfluoroalkyl radical, most preferably F, and are described in U.S. Pat. No. 3,282,875. Especially preferred are copolymers containing the side chain Polymerization can be carried out by the methods described in the above references. Especially useful is solution polymerization using ClF$_2$CCFCl$_2$ solvent and (CF$_3$CF$_2$COO)$_2$ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

The copolymers used in the layers described herein should be of high enough molecular weight to produce films which are self-supporting in both the melt-fabricable precursor form and in the hydrolyzed ion exchange form.

In addition to using separate films of the above-defined polymers, it is also possible to use a laminar film of two or more layers in making the membrane. For example, a film having a layer of a copolymer having sulfonyl groups in melt-fabricable form and a layer of a copolymer having carboxyl groups in melt-fabricable form, such as made by coextrusion, can be used in making the membrane of the invention.

When used as a component of a membrane to separate the anode and cathode compartments of an electrolysis cell, such as a chloralkali cell, the sulfonate polymers dealt with herein, after conversion to ionizable form, should have an equivalent weight in the range of 600 to 1500. Above 1500 the electrical resistivity becomes too high, and below 600 the mechanical and electrochemical properties are poor because of excessive swelling of the polymer. Preferably the equivalent weight is at least 900. Also, for most purposes, and for layers of such polymer of customary thickness, a value no greater than about 1400 is preferred.

For the carboxylate polymers dealt with herein, when used as a component of a membrane to separate the compartments of a chloralkali cell, the requirements thereof differ from those of the sulfonate polymers. The carboxylate polymer should have an equivalent weight in the range of 670 to 1500. A value below 1250 is preferred, so as to have lower resistance. Additionally, a value of at least 770 is preferred, so as to have good mechanical properties.

The multilayer membranes of the invention are prepared from component polymer films which have a thickness ranging from as low as about 13 microns (0.5 mil) up to about 150 microns (6 mils). As a multilayer membrane will generally be prepared from two or three such polymer films, the total thickness of polymer films used in making the resulting membrane will generally lie in the range of about 50 to 250 microns (2 to 10 mils), preferably 75 to 200 microns (3 to 8 mils), most preferably about 75 to 150 microns (3 to 6 mils).

The customary way to specify the structural composition of films or membranes in this field of art is to specify the polymer composition, equivalent weight and thickness of the polymer films in melt-fabricable form, and the type of reinforcing fabric, from which the membrane is fabricated. This is done, in the case of both the immediate product membrane of the lamination procedure and the hydrolyzed ion-exchange membrane made therefrom, because (1) the thickness of a fabric-reinforced membrane is not uniform, being thicker at the cross-over points of the reinforcing fabric and thinner elsewhere, and measurement made by calipers or micrometer indicates only the maximum thickness, and (2) in the case of the hydrolyzed ion-exchange membrane, the measured thickness varies depending on whether the membrane is dry or swollen with water or an electrolyte, and even on the ionic species and ionic strength of the electrolyte, even though the amount of polymer remains constant. As the performance of a film or membrane is in part a function of the amount of polymer, the most convenient way to specify structural composition is as stated immediately above.

The ion exchange polymers typically used in electrolysis membranes have poor notched tear properties. Accordingly the membranes of this invention are strengthened by having permanent reinforcement members partially or fully embedded therein to provide resistance to damage during installation and operation of the large sheets typically used in industrial size cells.

These reinforcement or support members are suitably in the form of a web of a woven or knit fabric. In some cases, the web used in the fabrication of the membrane may contain sacrificial elements in addition to the permanent reinforcement members. Sacrificial elements are those that are either chemically or physically removed either prior to operation in a cell or during initial cell operation. Their function includes the stabilization of the web of reinforcing elements and, in addition, the formation of the unique surface topography of the anode-facing surface (the outer surface of the second layer of fluorinated polymer) of the membrane of this invention. Alternatively it is suitable to use in combination two separate webs, one of which may consist of only reinforcement yarns and one of which may consist of only sacrificial elements. Other combinations of fabrics, each of which consists of reinforcement and/or sacrificial yarns, as long as there are both types of yarns in the combination, are also possible.

In the case of woven fabric, weaves such as plain weaves, ordinary basketweave and leno weave are suitable. Both the reinforcement threads and sacrificial threads can be either monofilament or multistranded.

The reinforcement members are perhalocarbon polymer threads. As employed herein, the term "perhalocarbon polymer" is employed to refer to a polymer which has a linear or branched carbon chain which may or may not contain ether oxygen linkages therein and which is totally substituted by fluorine or by fluorine and chlorine atoms. Preferably the perhalocarbon polymer is a perfluorocarbon polymer, as it has greater chemical inertness. Typical such polymers include homopolymers made from tetrafluoroethylene and copolymers of tetrafluoroethylene with hexafluoropropylene and/or perfluoro(alkyl vinyl ethers) with alkyl being 1 to 10 carbon atoms such as perfluoro(propyl vinyl ether). An example of a most preferred reinforcement material is polytetrafluoroethylene. Reinforcement threads made from chlorotrifluoroethylene polymers are also useful.

So as to have adequate strength in the fabric before lamination, and in the membrane after lamination, the reinforcement yarns should be of 30 to 600 denier, preferably 100 to 300 denier (denier is g/9000 m of yarn). However, yarns of such denier having a typical, round cross section, give membranes which are less satisfactory because of their thickness, especially at the yarn junctions where the crossover of the yarns thickens the reinforcing to twice the yarn thickness, thereby requiring use of layers of fluorinated polymer film of adequate thickness to preclude leaks; the overall effect is a thickness which results in operation at relatively high voltage. Fabric whose reinforcement members have the specified denier, but which also have a cross-sectional shape which is noncircular and which has an aspect ratio up to 20, preferably in the range of 1.5 to 20, most preferably in the range of 4 to 10, is preferably used. By "aspect ratio" is meant the ratio of the width of the reinforcement member to its thickness. Typical suitable cross-sectional shapes include rectangular, oval, elliptical, and oblong. Rectangular members can be in the form of thin narrow ribbon slit or slit and drawn from film, or can be extruded, in which case the corners may be rounded. Oval, elliptical, oblong and other shapes can be extruded or made by calendering fiber or yarn. It is also possible to calender a fabric to provide the required aspect ratio. As the web of support material should have a thickness in the range of 25 to 125 microns (1 to 5 mils), preferably 50 to 75 microns (2 to 3 mils), the reinforcing members should have a thickness of 12 to 63 microns (0.5 to 2.5 mils), preferably 25 to 38 microns (1 to 1.5 mils).

The fabric should have a thread count in the range of 1.6 to 16 reinforcement threads/cm (4 to 40 threads/inch) in each of the warp and weft. A thread count in the range of 3 to 8 reinforcement threads/cm is preferred.

Stable threads of PTFE having substantially rectangular cross-section can be made by lubricant-assisted PTFE sheet extrusion, slitting and stretching, or can be made by lubricant-assisted extrusion of flat PTFE filament and stretching, e.g., as described in U.S. Pat. No. 2,776,465.

The sacrificial members of a fabric can be yarn of any of a number of suitable substances, either natural or synthetic. Suitable substances include cotton, linen, silk, wool, rayon, polyamides such as 6—6 nylon, polyesters such as polyethylene terephthalate, and acrylics such as polyacrylonitrile. The cellulosic, polyester, polyamide and acrylic substances are preferred. The primary requirement of the sacrificial fibers is their removal without a detrimental effect on the remaining polymer matrix. With this proviso, the chemical makeup of the sacrificial fibers is not critical. In similar fashion the manner of removal of the sacrificial fibers is not critical as long as this removal does not interfere with the ion exchange capability of the final polymer in the cation permeable separator. For purposes of illustration, removal of sacrificial fibers of a cellulosic material such as rayon may be done with sodium hypochlorite. The sacrificial fibers are fibers which can be removed without a detrimental effect on either an intermediate polymer which is a precursor to a polymer possessing ion exchange sites or a polymer with ion exchange sites. The sacrificial fibers are removed from either type of such polymer leaving voids without interfering with the ion exchange capability of the final polymer. The manner of removal of the sacrificial fibers should not affect the reinforcing fibers employed to reinforce the membrane.

The sacrificial members, e.g., rayon or polyester threads or narrow ribbon slit from regenerated cellulose film, can suitably be of about 40 to 100 denier. They can have an aspect ratio in the range of 1 to 20, i.e., can have a rectangular, oval or elliptical cross section, or if of low enough denier, can be of aspect ratio 1, i.e., circular in cross section. As in the case of the reinforcement threads, the sacrificial threads should have a thickness of 12 to 63 microns, preferably 25 to 38 microns.

In each of the warp and weft of a fabric which contains both reinforcement and sacrificial yarns, the ratio of sacrificial yarns to reinforcement yarns in the fabric can be in the range of 1:1 to 24:1 or higher. Preferred ratios of sacrificial to reinforcement fibers are in the range from 2:1 to 16:1, and the most preferred ratios are 4:1, 8:1, and 16:1.

It is further preferred that there be an even number of sacrificial fibers for each reinforcement fiber. Although fabrics which have an odd number of sacrificial fibers for each reinforcement fiber can be used, they are not the preferred type. The reason for this preference can be seen by visualizing what happens in the case of a fabric of plain weave which has one sacrificial fiber for each reinforcement fiber: when the sacrificial fibers of the fabric are removed, the reinforcement fibers which remain are not in the configuration of a woven fabric; one set of fibers merely lies on the other, and while such is permissible under the invention, it is not preferred. It is, of course, possible in such cases to use special weaves, which will remain woven after the sacrifical fibers are removed. So as to avoid the necessity for making such special weaves, fabrics which have an even number of sacrificial fibers for each reinforcement fiber are preferred.

The reinforcement fabric, whether or not it contains sacrificial yarns, can be made such that the yarns of high aspect ratio present are either twisted or not twisted, and if twisted, the number of twists must be limited so that a high aspect ratio is maintained. A twist in the range of 0.8-4.7 twists/cm (2-12 twists/inch) is preferred.

The reinforcement yarns in a web which is a combination of reinforcement and sacrificial yarns should be such that, after later removal of the sacrificial yarns, the area of the membrane which does not contain permanent reinforcement yarns (i.e., the area which is the sum of all the small areas lying between the reinforcement yarns) is at least 50% and preferably at least 65% of the corresponding overall area of the membrane. Likewise when separate reinforcement and sacrificial webs are used in combination, the area of the membrane which does not contain permanent reinforcing yarns should be at least 50% and preferably 65% of the corresponding overall area of the membrane. In general, it will be understood that the amount of reinforcement fiber need only be sufficient to provide required strength to the membrane, and should not be so great as to impede ion transport therethrough.

In reference to the membrane described herein, having voids or channels at the outer surface of the second layer thereof, when a single fabric of reinforcement and sacrificial members is employed, the reinforcement members also become only partially embedded in the membrane, and when two webs, i.e., a web of reinforcement members and a separate web of sacrificial members, are employed, the web of reinforcement members can be either partially or completely embedded in the membrane.

When the combination of a web of reinforcement members and a separate web of sacrificial members is used, the web of reinforcement members is woven or knit as described above, but the web of sacrificial members can be either woven or knit as described above, or non-woven. Non-woven webs of rayon, polyester or polyamide are available, and are suitable for use as a sacrificial web herein. Such non-woven webs contain individual filaments having a wide range of deniers; e.g., individual filaments in a typical suitable non-woven polyester fabric range in width from about 2.5 microns to 20 microns, but often occur in bundles which produce, in a membrane prepared therewith, channels of width ranging from about 2.5 microns to well in excess of 20 microns. Woven and knit sacrificial fabrics, especially woven sacrificial fabrics, are preferred, because they are readily made, and form thin, flat, dimensionally stable webs.

The membrane can be made from the component layers of film and the web of support material (i.e., the fabric or fabrics of reinforcing and sacrificial yarns) with the aid of heat and pressure. Temperatures of about 200° C. to 300° C. are ordinarily required to fuse polymer films employed into adherent contact with each other, and to bring about an adequate degree of adherent contact of the component materials with each other, so as to form a unitary membrane structure with the support material, and, when more than two films are used, to make adjacent sheets of film fuse together; the temperature required may be even above or below this range, however, and will depend on the specific polymer or polymers used. The choice of a suitable temperature in any specific case will be clear, inasmuch as too low a temperature will fail to effect an adequate degree of embedment of the fabric into the polymer which after hydrolysis constitutes the ion-exchange polymer, and the fabric easily becomes detached from the structure, and too high a temperature will result in a membrane which, after removal of the sacrificial yarns, has an open area below 15%. Differential pressures of as little as about $2 \times 10^4$ pascals, to differential pressures exceeding $10^7$ pascals, e.g., as induced by a vacuum roll in a manner described below, can be used. One type of apparatus, which is suitable for batch operations, is a hydraulic press, which ordinarily will use a pressure in the range of $2 \times 10^5$ to $10^7$ pascals.

Apparatus suitable for continuous preparation of membrane, and which was employed in the examples unless otherwise specified, comprised a hollow roll with an internal heater and an internal vacuum source. The hollow roll contained a series of circumferential slots on its surface which allowed the internal vacuum source to draw component materials in the direction of the hollow roll. A curved stationary plate with a radiant heater faced the top surface of the hollow roll with a spacing of about 6 mm (¼ inch) between their two surfaces.

During a lamination run, porous release paper was used in contact with the hollow roll as a support material to prevent adherence of any component material to the roll surface and to allow vacuum to pull component materials in the direction of the hollow roll. Feed and takeoff means were provided for the component materials and product. In the feed means one idler roll of smaller diameter than the hollow roll was provided for release paper and component materials. The feed and takeoff means were positioned to allow component materials to pass around the hollow roll over a length of about 5/6 of its circumference. A further idler roll was provided for the release paper allowing its separation from the other materials. Takeoff means were provided for the release paper and the product membrane.

For use in ion exchange applications and in cells, for example a chloralkali cell for electrolysis of brine, the membrane should have all of the functional groups converted to ionizable functional groups. Ordinarily and preferably these will be sulfonic acid and carboxylic acid groups, most preferably in the form of alkali metal salts thereof. Such conversion is ordinarily and conveniently accomplished by hydrolysis with acid or base, such that the various functional groups described above in relation to the melt-fabricable polymers are converted respectively to the free acids or the alkali metal or ammonium salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethyl sulfoxide in the hydrolysis bath, to swell the membrane to increase the rate of hydrolysis.

The membranes described herein are modified on the outer surface of the first layer thereof (the surface facing the cathode of a chloralkali cell) so as to have enhanced gas release properties, for example by providing optimum surface roughness, or, preferably, by providing thereon a gas- and liquid-permeable porous non-electrode layer. Such layer may function to facilitate release of hydrogen bubbles, and is sometimes referred to as a hydrogen bubble release layer, and can be attached, detached, or integral.

Such layer can be a non-electrode layer in the form of a thin hydrophilic coating and is ordinarily of an inert electroinactive or non-electrocatalytic substance. Such non-electrode layer should have a porosity of 10 to 99%, preferably 30 to 70%, and an average pore diameter of 0.01 to 1000 microns, preferably 0.1 to 100 microns, and a thickness generally in the range of 0.1 to 500 microns, preferably 1 to 25 microns. A non-electrode layer ordinarily comprises an inorganic component and a binder; the inorganic component can be of a type as set forth in published UK patent application GB No. 2,064,586A, preferably tin oxide, titanium oxide, zirconium oxide, nickel oxide or an iron oxide such as $Fe_2O_3$ or $Fe_3O_4$. Other information regarding non-electrode layers on ion-exchange membranes is found in published European patent application No. 0,031,660, and in Japanese Laid-open patent application Nos. 56-108888 and 56-112487.

Acceptable gas release properties on the outer surface of the first layer of the membrane, the surface facing the cathode of a chloralkali cell, can alternatively be provided by optimizing the roughness of that surface. For best hydrogen release properties, the roughness should be in the range of about 0.5 to 5 microns (20 to 200 microinches). Such a roughened surface can be made by placing the precursor form of the membrane, i.e., that wherein the fluorinated polymer is still in a melt fabricable form, against a surface having the desired roughness, e.g., a release paper, an abrasive paper or a roughened metal roll, under heat and pressure. More information about suitable techniques can be found in U.S. Pat. Nos. 4,323,434 and 4,272,353.

A thin layer of asbestos paper placed in contact with the surface of the membrane which faces toward the cathode also functions as a hydrogen bubble release layer. The thickness of this layer can be 100–500 microns, preferably 200–300 microns.

An electrocatalyst on the outer surface of the first layer of the membrane can also function as a hydrogen bubble release layer to provide for good gas release properties. Such electrocatalyst can be of a type known in the art, such as those described in U.S. Pat. Nos. 4,224,121 and 3,134,697, and published UK patent application GB No. 2,009,788A. Preferred cathodic electrocatalysts include platinum black, Raney nickel and ruthenium black.

The binder component in a non-electrode layer, or in an electrocatalyst composition layer, can be, for example, polytetrafluoroethylene; a fluorocarbon polymer, at least the surface of which is hydrophilic by virtue of treatment with ionizing radiation in air or a modifying agent to introduce functional groups such as —COOH or —SO$_3$H (as described in published UK patent application GB No. 2,060,703A), or treatment with an agent such as sodium in liquid ammonia; a functionally substituted fluorocarbon polymer or copolymer which has carboxylate or sulfonate functional groups; or polytetrafluoroethylene particles modified on their surfaces with fluorinated copolymer having acid type functional groups (GB Pat. No. 2,064,586A). Such binder is suitably used in an amount of 10 to 50% by wt. of the non-electrode layer or of the electrocatalyst composition layer.

A non-electrode layer can be applied to a membrane by various techniques known in the art, which include preparation of a decal which is then pressed onto the membrane surface, application of a slurry in a liquid composition (e.g., dispersion or solution) of the binder followed by drying, screen or gravure printing of compositions in paste form, hot pressing of powders distributed on the membrane surface, and other methods as set forth in GB Pat. No. 2,064,586A. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

Removal of the sacrificial fibers from the membrane can variously be done before, during or after conversion of the original membrane in melt-fabricable form to the ion exchange membrane. It can be done during said conversion when the sacrificial members are of a material which is destroyed by the hydrolysis bath employed for said conversion; an example is hydrolysis of a nylon polymer by caustic. It can be done before said conversion, e.g., in the case of rayon sacrificial members by treatment with aqueous sodium hypochlorite before said conversion, in which case there is prepared a membrane wherein the sacrificial fibers have been removed and the functional groups of the polymer layers are still in —COOR and —$SO_2X$ form. Hydrolysis can also first be done, in which case, the functional groups are converted to —COOH and —$SO_3H$ or salt thereof, and in which case there is prepared a membrane in ion exchange form which still contains the sacrificial fibers; the sacrificial fibers are subsequently removed, for example, in the case of rayon or other cellulosic members, polyester, polyamide or acrylic members, in a membrane used in a chloroalkali cell, by action of hypochlorite ions formed during ordinary operation of the cell.

The sacrificial elements used in the present invention can also be elongate metal members, e.g. metal wires, suitably in the form of hardware cloth or screen. In such case, following partial embedment in the second surface of the membrane, these sacrificial elements can be removed by physically stripping them from the membrane to leave channels, particularly when the circumferential wrap of the embedding polymer around the individual wires is not greatly more than 50%, or in many cases can be chemically removed.

Removal of sacrificial members from a membrane leaves voids in the membrane at the sites originally occupied by the sacrificial members. The voids are suitably in the form of channels resulting from removal of sacrificial fibers, in which case they are in the form of an imprint of that portion of the sacrificial fibers which was embedded.

The channels should be provided to have a nominal width of 2.5 microns or greater, and preferably in the range of 10 to 100 microns. This nominal width is approximately the same as that of the sacrificial fiber, the removal of which results in formation of the channel. It is believed that the actual size of a channel can change, shrinking or collapsing when the membrane is dehydrated, and swelling when the membrane itself is swollen. The channels left by removal of sacrificial threads of a woven or knit fabric are desirably in the range of 10 to 100 microns in width, and by removal of a nonwoven sacrificial fabric are desirably 2.5 microns or greater in width.

The reinforced membranes of the invention are prepared so that the web of support material partially embedded in the membrane does not penetrate through the first layer of fluorinated polymer which has carboxyl functionality. As a result, the channels lie at least predominantly in layers other than the first layer of polymer, and preferably completely in the second layer of polymer, which has sulfonyl functionality. The channels of the ion exchange membrane formed by removal of the sacrificial members do not penetrate through the membrane from one surface to the opposing surface, and the membrane is therefore impermeable to hydraulic flow of liquid at the low pressures typical of those occurring in a chloralkali cell. (A diaphragm, which is porous, permits hydraulic flow of liquid therethrough with no change in composition, while an ion exchange membrane permits selective permeation by ions and permeation of liquid by diffusion, such that the material which penetrates the membrane differs in composition from the liquid in contact with the membrane.) It is an easy matter to determine whether there are or are not channels which penetrate through the membrane by a leak test with gas or liquid.

A critical requirement of the subject invention is that the anode-facing surface (the outer surface of the second layer) of the membrane is characterized by a specific surface topography which is characterized by specific ranges of "void volume" and "open area". Although such membrane performs, for reasons which are not fully understood, at higher current efficiency and lower power consumption than similarly constituted membrane with closed channels, it is believed that reinforced membrane with such topography permits facile exchange of anolyte liquor between the bulk anolyte and that in the voids.

"Void volume" is defined as the volume of the voids into which anolyte can flow, expressed as percent of the volume of the membrane. It will be understood that in ascertaining void volume, which is a measure of the open void content of the membrane, one determines the volume of the membrane contained between the cathode-facing side of the membrane and a plane contacting the outermost projections of the anode-facing side of the membrane. The volume of the cathode-facing side bubble release layer is not included in the volume of the membrane for estimation of void volume. Methods of measuring void volume are described hereinbelow. The void volume should be between 5 and 40%. Values of void volume below 5% result in higher cell voltage than desired, while values greater than 40% result in weakened physical strength of the membrane and increased probability of channels extending through the entire membrane resulting in leakage and loss of current efficiency. Preferably the void volume is 8–20%.

"Open area" is defined as the area of the openings to the channels or voids measured at the anode-facing surface of the membrane, expressed as a percent of the total area of the channels or voids measured at their widest points. It will be understood that the total area of the channels or voids is therefore the projection of the sacrificial elements on a plane parallel to the anode-facing surface of the membrane. The open area thus is a measure of degree of accessibility of the channels or voids to the anolyte and should be between 15 and 100%. It has been found that open areas less than 15% cause the current efficiency to be decreased when the membrane has a bubble release layer on the cathode face. Preferably the open area is between 50 and 90%.

The channels or voids in the anode-facing side of a membrane having a void volume and an open area in the desired range result from the removal of the sacrificial elements and are controlled by the proper selection of the reinforcing web (webs) and the temperature range and differential pressure during lamination.

Figure 1:
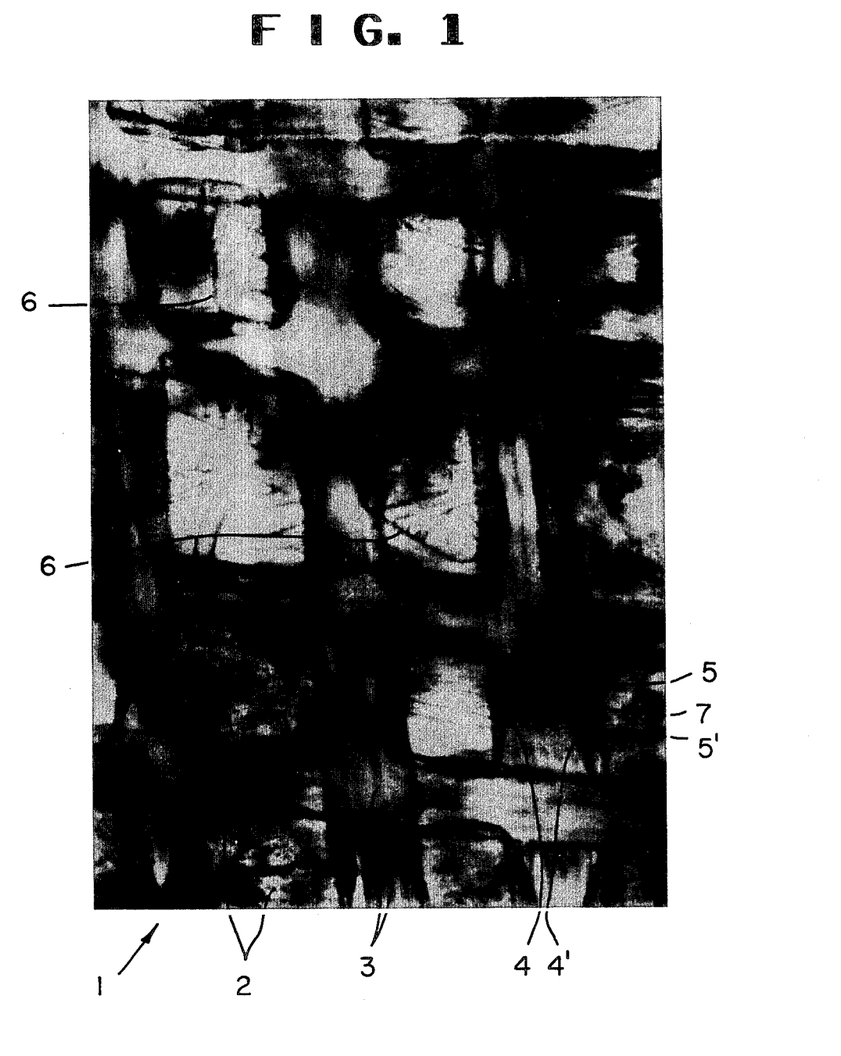
FIG. 1 is a photomicrograph of the sulfonate surface of a membrane of the invention, made with an optical microscope, at a magnification of 200×.
Figure 2:
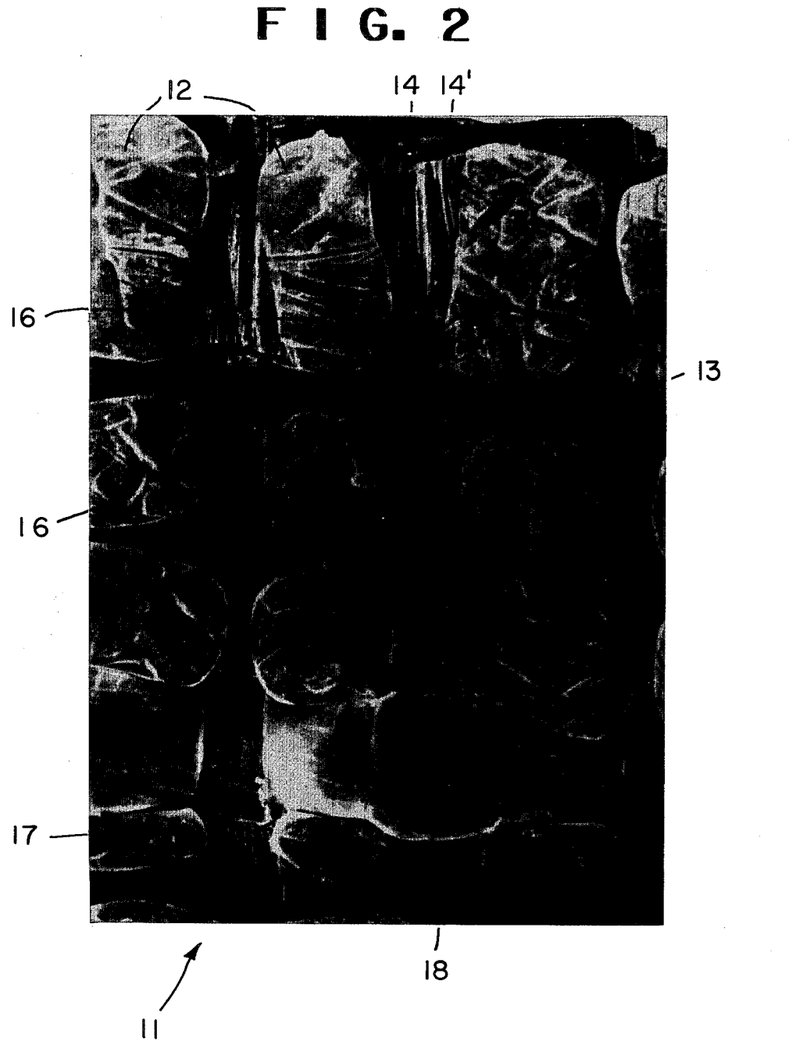
FIG. 2 is a photomicrograph of the sulfonate surface of a membrane of the invention, made with a scanning electron microscope, at a magnification of 160×.
Figure 3:
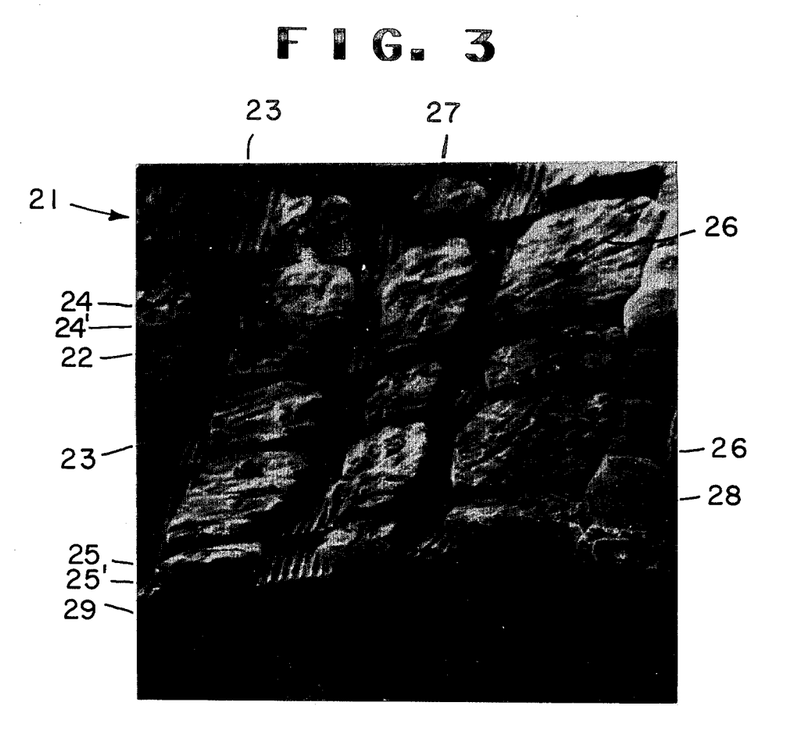
FIG. 3 is a photomicrograph in perspective view of a cross-section of a membrane of the invention, made with a scanning electron microscope, at a magnification of 120×.

FIGS. 1, 2 and 3 show the surface topography of typical membranes of the invention. These membranes were fabricated from Substrate A and Fabric C, described below in reference to the examples.

FIG. 1 is an optical photomicrograph of the sulfonate surface (the outer surface of the second layer) of a membrane 1 of the invention. Channels 3, formed by chemical removal of sacrificial yarns of a fabric, lie between knobs 2 of sulfonate polymer having relatively flat surfaces in which there are shallow depressions 6 which are the imprint of the release paper used in fabrication of the membrane. The open area of the membrane is defined by the edges 4 and 4' of these flattened knobs 2 at the membrane surface. The width of a typical channel within the membrane can be seen as the distance between channel extremities 5 and 5', which are visible by virtue of the transparency of the sulfonate polymer. The striations 7 within the channels 3 are indicative of the sacrificial yarns having been multistranded.

FIG. 2 is a scanning electron photomicrograph of the sulfonate surface of a membrane 11 of the invention, made after shadowing the surface with gold-palladium alloy. Channels 13, formed by chemical removal of sacrificial yarns of a fabric, lie between knobs 12 of sulfonate polymer having relative flat surfaces in which there are shallow depressions 16 which are the imprint of the release paper used in fabrication of the membrane. The striations 17 within the channels 13 are indicative of the sacrificial yarns having been multistranded. The open area of the membrane is defined by the edges 14 and 14' of the flattened knobs 12 at the membrane surface. That the maximum width of the channels within the membrane cannot be seen is due to the opacity of the metal shadowing, but the greater width of the channels beneath the edges 14 and 14' of the knobs 12 can be inferred from the disappearance of some of the striations 17 under the edges of the knobs. A reinforcing yarn 18 can also be seen.

FIG. 3 is a scanning electron photomicrograph of a perspective view of a cross-section of a membrane 21 of the invention, made after shadowing with gold-palladium alloy. Channels 23, formed by chemical removal of sacrificial yarns of a fabric, lie between knobs 22 of sulfonate polymer having relatively flat surfaces in which there are shallow depressions 26 which are the imprint of the release paper used in fabrication of the membrane. A cross-section 29 through the membrane reveals the cross-sectional shape of both knobs 22 and channels 23; that the first (carboxylate) and second (sulfonate) layers of fluorinated polymer cannot be distinguished in the cross-section is due to the opacity of the metal shadowing. The striations 27 within the channels 23 are indicative of the sacrificial yarns having been multistranded. The open area of the membrane is defined by the edges 24 and 24' of the flattened knobs 22. The width of a typical channel within the membrane is the distance between channel extremities 25 and 25'. A reinforcing yarn 28 can also be seen.

A preferred reinforced membrane of the invention is that which has a first layer of fluorinated polymer whose functional groups are —COOR functional groups as one surface layer, a second layer of fluorinated polymer whose functional groups are —SO$_2$F functional groups as the other surface layer, said first and second layers being in adherent contact with one another, and the sacrificial members of the web of support material partially embedded in the second layer. Said first layer has a thickness in the range of about 13 to 75 microns (0.5-3 mils), and said second layer has a thickness in the range of about 75 to 150 microns (3-6 mils). After hydrolysis to the ion exchange form and removal of the sacrificial members of the support material, the resulting ion exchange membrane is a preferred membrane for a chloralkali cell. When there are additional layers of fluorinated polymer, these will be between said first and second layers, so that said first and second layers will always be the outermost said layers, and adjacent layers will be in adherent contact with one another.

It is also possible to make reinforced membrane whose constitution with respect to the fluorinated ion-exchange polymer thereof (or precursor polymer thereof) is either (1) a single layer of polymer whose functional groups are —CFZ—COOM groups (or —CFZ—COOR groups), or (2) first and second layers of polymer, both being of polymer whose functional groups are —CFZ—COOM groups (or —CFZ—COOR groups), the two layers differing either in equivalent weight only or in chemical composition, with the higher equivalent weight layer or the composition with the lower water absorption forming the first (cathode-facing) layer of the membrane. In each case, such membrane is made such that the sacrificial members of the support material are partially embedded in the outer surface of the second (anode-facing) layer of the membrane.

It is also possible to make reinforced membrane whose constitution with respect to the fluorinated ion-exchange polymer thereof (or precursor polymer thereof) is either (1) a single layer of polymer whose functional groups are —CFQ—SO$_3$M groups (or —CFQ—SO$_2$X groups), or (2) first and second layers of polymer, both being of polymer whose functional groups are —CFQ—SO$_3$M groups (or —CFQ—SO$_2$X groups), the two layers differing either in equivalent weight only or in chemical composition, with the higher equivalent weight layer or the composition with the lower water absorption forming the first (cathode-facing) layer of the membrane. In each case, such membrane is made such that the sacrificial members of the support material are partially embedded in the outer surface of the second (anode-facing) layer of the membrane.

It is also possible to make reinforced membrane whose constitution with respect to the fluorinated ion-exchange polymer thereof (or precursor polymer thereof) is either (1) a single layer of polymer whose functional groups are —CFQ—SO$_3$M groups (or —CFQ—SO$_2$X groups) and whose cathode-facing surface has been chemically converted to carboxyl groups, or (2) first and second layers of polymer, both being of polymer whose functional groups are —CFQ—SO$_3$M groups (or —CFQ—SO$_2$X groups), the two layers differing either in equivalent weight only or in chemical composition, with the higher equivalent weight layer or the composition with the lower water absorption forming the first (cathode-facing) layer of the membrane and whose cathode-facing surface has been chemically converted to carboxyl groups. In each case, such membrane is made such that the sacrificial members of the support material are partially embedded in the outer surface of the second (anode-facing) layer of the membrane.

A principal use of the ion exchange membrane of the invention is in electrochemical cells. Such a cell comprises an anode, a compartment for the anode, a cathode, a compartment for the cathode, and a membrane which is situated to separate the two said compartments. One example is a chloralkali cell, for which the membrane should have the functional groups in salt form; in such a cell, a layer of the membrane which has carboxylic functional groups will be disposed toward the cathode compartment.

The electrochemical cell, especially a chloralkali cell, will ordinarily be constructed such that the gap or spacing between the anode and cathode is narrow, i.e., no greater than about 3 mm. It is also often advantageous to operate the cell and electrolysis process with the membrane in contact with either the anode or cathode, which can be accomplished with the aid of an appropriate hydraulic head in one cell compartment, or by using an open mesh or grid separator to urge the membrane and selected electrode into contact. It is often further advantageous for the membrane to be in contact with both the anode and cathode in an arrangement referred to as a zero-gap configuration. Such arrangements offer advantages in minimizing the resistance contributed by the anolyte and catholyte, and thus provide for operation at lower voltage. Whether or not such arrangements are used, either or both electrodes can have an appropriate catalytically active surface layer of type known in the art for lowering the overvoltage at an electrode.

Open voids of the kind described herein result from removal of the sacrificial members either from a cation-exchange membrane which is a membrane of fluorinated polymer having —COOM and/or —SO$_3$M functional groups, where M is H, Na, K or NH$_4$, or from a precursor membrane which is a membrane of fluorinated polymer having —COOR and/or —SO$_2$X functional groups, where R is lower alkyl and X is F or Cl, having at the outer surface of the second layer thereof sacrificial members partially embedded therein.

The membrane of the invention has been found to perform at a current efficiency greater than 95% and at a voltage of no more than 3.1 volts, and often below 3.0 volts, in zero-gap and narrow-gap chloralkali cells. As a result, there has been provided a method for decreasing the power consumption in a chloralkali process wherein the electrode spacing is no greater than about 3 mm and the membrane has a hydrogen bubble release surface on the side facing the cathode, the method comprising providing at the outer surface of the opposite side of the membrane facing the anode voids characterized by a void volume and open area as specified herein.

To further illustrate the innovative aspects of the present invention, the following examples are provided.

EXAMPLES

In the examples, abbreviations are used as follows:
PTFE refers to polytetrafluoroethylene;
TFE/EVE refers to a copolymer of tetrafluoroethylene and methyl perfluoro(4,7-dioxa-5-methyl-8-nonenoate);
TFE/PSEPVE refers to a copolymer of tetrafluoroethylene and perfluoro(3,6-dioxa-4-methyl-7-octenesulfonyl fluoride);
EW refers to equivalent weight.

Substrate A was a laminar film having a layer of TFE/EVE 38 microns (1.5 mils) thick having an EW of 1050, and a layer of TFE/PSEPVE 102 microns (4 mils) thick having an EW of 1085, said film having been made by coextrusion as described in application U.S. Pat. Ser. No. 436,422 filed Oct. 25, 1982.

Substrate B was a film of TFE/PSEPVE 25 microns (1 mil) thick having an EW of 1085.

Fabric A was a woven fabric of plain weave, having in both the warp and weft (a) 6 threads/cm (15 threads/inch) of twisted 200 denier monofilaments of PTFE, each monofilament being 19 microns (0.75 mil) thick and 508 microns (20 mils) wide in the untwisted configuration, and twisted 3.9 twists/cm (10 twists per inch) and flattened to form thread having in the twisted configuration a cross-sectional thickness of 56 microns (2.2 mils) and width of 178 microns (7 mils) (aspect ratio 3.2), as reinforcing yarns, and (b) 24 threads/cm (60 threads/inch) of 40 denier polyethylene terephthalate yarns as sacrificial yarns. Thus, in each of the warp and weft, consecutive PTFE threads are separated by four polyester yarns. This fabric was calculated to have a sacrificial element volume of 17 cm$^3$/m$^2$ of fabric and a reinforcing fiber volume of 11 cm$^3$/m$^2$ of fabric.

Fabric B was like fabric A except that it had 24 threads/cm of 50 denier rayon yarns as sacrificial yarns in place of the polyester yarns. This fabric was calculated to have a sacrificial element volume of 19 cm$^3$/m$^2$ of fabric and the same reinforcing fiber volume as Fabric A.

Fabric C was like fabric A except that it had 3.2 threads/cm (8 threads/inch) of the 200 denier PTFE yarns and 25.6 threads/cm (64 threads/inch) of the 40 denier polyester. This construction was calculated to have a sacrificial element volume of 18 cm$^3$ m$^2$ of fabric and a reinforcing fiber volume of 6 cm$^3$/m$^2$ of fabric.

Fabric system D consisted of two separate fabrics D-1 and D-2. Fabric D-1 had no sacrificial yarns but consisted only of the PTFE reinforcing yarns like those in Fabric A in a leno weave having 6 threads cm in the weft and 12 threads cm (30 threads/inch) in the warp. Fabric D-2 had no reinforcing yarns but consisted of 30 threads/cm (75 threads/inch) in both warp and weft of 50 denier rayon yarns. In making reinforced membrane with fabric system D, Fabrics D-1 and D-2 were placed in contact with one another and Fabric D-1 was placed in contact with the PSEPVE side of Substrate A. This fabric construction was calculated to have a sacrificial element volume of 24 cm$^3$/m$^2$ of fabric and a reinforcing fiber volume of 17 cm$^3$/m$^2$ of fabric.

Fabric E was a woven fabric having in both the warp and weft 6 threads/cm of substantially round 100 denier PTFE multifilament reinforcing yarn, and 24 threads/cm of 40 denier polyethylene terephthalate sacrificial yarns. This fabric was calculated to have a sacrificial element volume of 17 cm$^3$/m$^2$ of fabric and a reinforcing fiber volume of 6.3 cm$^{3/m2}$ of fabric.

Coating dispersion A consisted of the following:

| | |
|---|---|
| ethanol (absolute) | 84.2% by wt. |
| TFE/PSEPVE hydrolyzed to the acid (H$^+$) form | 2.6% by wt. |
| ZrO$_2$ (5–9 micron particles) | 13.2% by wt. |
| non-ionic surfactant | trace |

The non-ionic surfactant was where n is 9-10 ("Triton" X-100 available from Rohm & Haas Chemical Co.).

Coating dispersion B was like coating dispersion A, except that in place of $ZrO_2$ it contained 9.6% by wt. of nickel oxide (1-4 micron particles).

Cell (type A) was a zero-gap chloralkali cell having a dimensionally stable anode, a platinized nickel screen cathode, and a nickel expanded metal mesh cathodic current collector, having an active membrane area of 45 cm$^2$, assembled such that the membrane contacted both anode and cathode.

Cell (type B) was a narrow-gap chloralkali cell similar to cell (type A), the differences being that (1) an expanded metal mild steel mesh cathode was used in place of the nickel current collector and platinized screen cathode, (2) a 3 mm gap was maintained between the cathode and the membrane, and (3) a differential hydraulic pressure was maintained between the anode and cathode chambers such that the membrane was maintained in contact with the anode.

Cell (type C) was similar to cell (type A), the difference being that (1) a nickel expanded metal mesh having a Raney nickel coating thereon, as described in application Ser. No. 403,306 filed July 30, 1982, was used in place of the platinized screen cathode, (2) the active membrane area was 0.2 m$^2$, and (3) the anolyte and catholyte were recirculated to their respective compartments.

All cell tests were made at 3.1 KA/m$^2$, 90° C., 32% caustic with 200 gpl NaCl in the anolyte unless otherwise specified.

Void volume and open area can be measured on the membrane either before or after the removal of the sacrificial elements, inasmuch as the volume occupied by a sacrificial element before removal will be a void after its removal.

Void volume is determined from a cross-section profile of the membrane by making a cut perpendicular to the plane of the membrane and at an angle of about 40° to the long axis of the reinforcing threads. The void volume can be estimated by examining this cross-section under an optical microscope. For a quantitative measurement, a photomicrograph of the cross-section can be taken, enlarged, and the cross-sectional areas of the membrane and the channnels or voids determined by cutting the respective areas from the photograph and weighing them.

Void volume can also be calculated quite precisely in the case where the polymer penetrates the web containing the sacrificial elements such that the surface of the sulfonyl-containing polymer and the exposed surface of the web nearly coincide. In this case the void volume is [the volume of the sacrificial elements per unit area (based on thread count, denier and yarn density) divided by the sum of the polymer volume plus sacrificial element volume plus reinforcing yarn volume for the same unit area] times 100. In this calculation, the polymer volume is calculated from the thickness of the film substrates in the melt-fabricable form, for the reasons described hereinabove.

In all of the following examples the molten polymer during fabrication penetrated the fabric(s) such that the anode-facing surface of the polymer coincided with the exterior surface of the fabric(s).

Open area, as indicated above, is the area of the channels or voids open to the anode surface expressed as a percentage of the projected area of the channels or voids left by the sacrificial elements. It can be visually estimated with an optical microscope by examination of the surface of the anode-facing side of the membrane and comparison of the area of the openings to the channels or voids to total projected area of the channels or voids. The openings to the channels or voids can be perceived better if a stain or paint is applied to the anode-facing surface to enhance depth perception because of the clarity (transparency) of the ion-exchange polymer. Use of a scanning electron microscope gives images with superior depth perception. Quantitative measurements can be made by photographing the anode-facing side of the membrane, and the reinforcing web containing the sacrificial elements, at the same magnification, cutting out the areas representing the openings to the channels or voids, and weighing them and comparing this value to the weight of sacrificial element areas of the matching photograph; determinations are made for at least three separate representative regions of a membrane, and averaged. When an optical microscope is used, the image of both the openings to the channels or voids and the channels or voids themselves can be obtained on the same photograph, with suitable adjustment of the lighting. The walls of channels are merely the mold image of the sacrificial elements.

Photomicrographs and visual examination of surfaces and cross-sections of membranes were made with a standard laboratory research type of microscope such as the Bausch and Lomb "Balplan" instrument equipped with incident (reflected), transmitted and side lighting, stereo optics and a "Polaroid" type camera system equipped with automatic exposure controls. Typical photographs were made at magnification of 40-100× using a combination of incident and transmitted lighting.

EXAMPLE 1

Fabric A was thermally bonded to the sulfonyl fluoride side of substrate A on a continuous laminator at a line speed of 0.3 m/min (1 ft/min) at 220° C. and a differential pressure of $3.4 \times 10^4$ Pa (10 inches of mercury) vacuum. The resulting reinforced membrane was hydrolyzed to the cation-exchange form in an aqueous bath containing 30% dimethyl sulfoxide and 11% KOH for 20 minutes at 90° C., rinsed in water, dried, and coated on the carboxylic side by spraying with coating dispersion A to provide a coating weight of 2.2 g $ZrO_2/m^2$. This membrane had a void volume of 10% and an open area of approximately 60%. Four samples of the membrane were tested in electrolysis of brine in type A cells with the sulfonate side of the membrane toward the anode; the average result over 28 days of operation was 96.2% current efficiency at 3.07 volts while producing 32.3% caustic; the power consumption was 2132 kWh/MT (kilowatt hours per metric ton of caustic). In a type C cell, over 7 days, 32.1% caustic was made at 96.3% current efficiency and 2.95 volts; the power consumption was 2046 kWh/MT.

EXAMPLE 2

Example 1 was substantially repeated except that fabric B was used in place of fabric A. This membrane had a void volume of 11% and an open area of approximately 60%. Upon testing in a type A cell the cell voltage and current efficiency were substantially the same as in Example 1.

EXAMPLE 3

Example 1 was substantially repeated except that fabric C was used in place of fabric A. This membrane had a void volume of 11% and an open area of approximately 50%. The membrane was tested in a type A cell, and over 11 days of operation produced 32.3% caustic at 95.3% current efficiency at 3.00 volts; the power consumption was 2103 kWh/MT. When tested in a type C cell, over 4 days of operation, 32.5% caustic was produced at 97.1% current efficiency and 2.91 volts; the power consumption was 2002 kWh/MT.

EXAMPLE 4

Example 1 was substantially repeated except that, in place of fabric A, fabric system D was used. This membrane had a void volume of 13% and an open area of approximately 90%. The membrane was tested in type A cells, and the average result over 8 days of operation was 95% current efficiency at 3.13 volts while producing 31.7% caustic; the power consumption was 2201 kWh/MT. In a type C cell, over 7 days, 32.4% caustic was made at 94.4% current efficiency and 3.04 volts; the power consumption was 2151 kWk/MT.

EXAMPLE 5

Example 1 was substantially repeated except that fabric E was used in place of fabric A. This membrane had a void volume of 10% and an open area of approximately 60%. In a type A cell over 6 days, 32.4% caustic was made at 97% current efficiency and 3.07 volts; the power consumption was 2114 kWh/MT.

EXAMPLE 6

Example 2 was substantially repeated except that coating dispersion B was used in place of coating dispersion A. This membrane had a void volume of 11% and an open area of approximately 60%. In a type A cell, 32.2% caustic was made at 96% current efficiency at 3.07 volts; the power consumption was 2136 kWh/MT.

EXAMPLE 7

Example 1 was substantially repeated except that after the membrane was hydrolyzed it was not coated with coating dispersion A, but instead, a sheet of asbestos paper 229 microns (9 mils) thick was placed in contact with the carboxylate side of the membrane to function as a bubble release layer. The membrane was tested in a type A cell having a Raney nickel cathode (of the kind described in the description of the type C cell) in place of the platinized nickel screen cathode. Over 10 days of operation, 32% caustic was produced at 96.4% current efficiency and 3.21 volts; the power consumption was 2224 kWh/MT.

EXAMPLE 8

Example 1 was substantially repeated except that the thermal bonding was carried out at 225° C. and a differential pressure of $7.1 \times 10^4$ Pa (21 inches of mercury) vacuum. This membrane had the same void volume as Example 1 of 10%, and the open area was decreased to approximately 15%. Upon testing the resulting membrane in type A cells, the average result over 8 days of operation was 93.9% current efficiency at 3.00 volts while producing 32.0% caustic; the power consumption was 2134 kWh/MT.

COMPARATIVE EXAMPLE A

Fabric A was thermally bonded with the sulfonyl fluoride side of substrate A on one side of the fabric and substrate B on the other side, to substantially encapsulate both the sacrificial and the reinforcing yarns. Substrate B was placed against the porous release paper, using the fabrication method described hereinabove. The thermal bonding was carried out at 225° C. and a differential pressure of $7.1 \times 10^4$ Pa, and the laminate was hydrolyzed and coated as in Example 1. This membrane had a void volume of 9%. However, because of nearly complete encapsulation of the sacrificial elements the open area was less than 1%. The resulting membrane was tested in a type B cell with the sulfonate side of the membrane in contact with the anode; over 9 days of operation, 31.8% caustic was produced at 88.8% current efficiency and 3.43 volts; the power consumption was 2580 kWh/MT.

COMPARATIVE EXAMPLE B

Example A was substantially repeated except that after the membrane was hydrolyzed it was not coated with coating dispersion A, but instead, a sheet of asbestos paper 229 microns (9 mils) thick was placed in contact with the carboxylate side of the membrane. Upon testing in a cell as described in Example 7, over 4 days of operation, 32% caustic was produced at 88% current efficiency and 3.20 volts; the power consumption was 2429 kWh/MT.

COMPARATIVE EXAMPLE C

Fabric D-1 was thermally bonded with the sulfonyl fluoride side of substrate A on one side of the fabric and substrate B on the other side, to encapsulate the reinforcing yarns. Substrate B was placed against the porous release paper during the thermal bonding, using the fabrication method described hereinabove. This membrane did not contain any sacrificial elements and thus the anode-facing side of the membrane had only the shallow depressions corresponding to the paper fiber pattern of the release paper used during the thermal bonding operation. The shallow depressions were estimated to correspond to a void volume of less than 3%. Since these shallow depressions are completely exposed to the anolyte, the open area was 100%. The carboxylate side of the membrane was placed in contact with a sheet of asbestos paper 229 microns (9 mils) thick. The membrane was tested in a cell as described in Example 7, where, over 7 days of operation, 32% caustic was produced at 93% current efficiency and 3.3 volts; the power consumption was 2370 kWh/MT.

EXAMPLE 9

When Example 1 is repeated, with the exception that the carboxylate surface of the membrane is not coated but rather is roughened to a roughness of ca. 1 micron by sandblasting, and a sample of the resulting membrane is used in a cell for the electrolysis of brine, substantially the same results will be obtained.

INDUSTRIAL APPLICABILITY

The ion exchange membranes of the present invention are technically advanced over membranes of the prior art. They exhibit improved performance characteristics when used as the membrane for electrolysis of NaCl solution in a chloroalkali cell, including operation at low voltage and high current efficiency, and thus at low power consumption. There is accordingly a substantial saving in operating costs resulting from the lowered consumption of power.

The membranes of this invention may also be used for the electrolysis of KCl and other inorganic compounds. For instance, the electrolysis of water is carried out to make hydrogen and oxygen. The membranes may also be used in fuel cells. Electrolysis of organic compounds is also possible.

We claim:

1. In a reinforced fluorinated cation-exchange polymer membrane which is impermeable to hydraulic flow of liquid, said membrane comprising at least first and second layers of fluorinated polymers whose functional groups are —CFZ—COOM groups or —CFQ—SO$_3$M groups, where M is H, Na, K or NH$_4$, Z is F, CF$_3$ or CF$_2$Cl, and Q is F, Cl, C$_1$ to C$_{10}$ perfluoroalkyl or CF$_2$Cl, said layers when adjacent being in adherent contact with one another, said first layer being of polymer whose functional groups are —CFZ—COOM groups and said second layer being of polymer whose functional groups are —CFQ—SO$_3$M groups, the improvement wherein said membrane has a hydrogen bubble release layer at the outer surface of said first layer, has voids at the outer surface of said second layer characterized by a void volume of 5 to 40% and an open are of 15 to 100%, and wherein said membrane has reinforcement strands partially or completely embedded therein, and each said polymer with —CFZ—COOM groups has an equivalent weight of 670 to 1500 and each said polymer with —CFQ—SO$_3$M groups has an equivalent weight of 600 to 1500.

2. The membrane of claim 1 wherein said fluorinated polymer is perfluorinated polymer, each said polymer with —CFZ—COOM groups has an equivalent weight of 770 to 1250, and each said polymer with —CFQ—SO$_3$M groups has an equivalent weight of 900 to 1400.

3. The membrane of claim 2 wherein said voids are channels, having one dimension in the plane of said membrane which dimension is large relative to the other two dimensions of said channels, at the outer surface of said second surface layer.

4. The membrane of claim 3 wherein said voids are channels resulting from removal of partially embedded sacrificial strands.

5. The membrane of claim 4 wherein said voids are channels resulting from chemical removal of partially embedded sacrificial strands which are sacrificial yarns.

6. The membrane of claim 5 wherein Z is F, Q is F, said —CF$_2$—COOM functional groups are part of —(CF$_2$)$_m$—COOM moieties where m is 1, 2 or 3, and said —CF$_2$—SO$_3$M functional groups are part of —(CF$_2$)$_p$—SO$_3$M moieties where p is 2 or 3.

7. The membrane of claim 6 wherein said void volume is 8 to 20%, and said open area is 50 to 90%.

8. The membrane of claim 7 wherein said reinforcement strands are reinforcement yarns of perfluorocarbon polymer.

9. The membrane of claim 8 wherein said reinforcement yarns are in the form of a first woven or knitted fabric, and said channels result from chemical removal of sacrificial yarns in the form of a second woven or knitted fabric.

10. The membrane of claim 9 wherein said —(CF$_2$)$_m$—COOM moieties are part of —O—(CF$_2$)$_m$COOM moieties, and said —(CF$_2$)$_p$—SO$_3$M moieties are part of —O—(CF$_2$)$_p$—SO$_3$M moieties.

11. The membrane of claim 10 wherein said first and second layers of fluorinated polymer are the sole layers of fluorinated polymer, and said first layer is in adherent contact with said second layer.

12. The membrane of claim 11 wherein said hydrogen bubble release layer is a gas- and liquid-permeable porous non-electrode layer in adherent contact with the outer surface of said first layer.

13. The membrane of claim 12 wherein said gas- and liquid-permeable porous non-electrode layer comprises zirconium oxide.

14. The membrane of claim 11 wherein said hydrogen bubble release layer is the outer surface of said first layer, having a roughness of 0.5 to 5 microns.

15. The membrane of claim 8 wherein said channels result from chemical removal of the sacrificial yarns of a woven or knitted fabric which comprises both said sacrificial yarns and said reinforcement yarns.

16. The membrane of claim 15 wherein said —(CF$_2$)$_m$—COOM moieties are part of —O—(CF$_2$)$_m$COOM moieties, and said —(CF$_2$)$_p$—SO$_3$M moieties are part of —O—(CH$_2$)$_p$—SO$_3$M moieties.

17. The membrane of claim 16 wherein said first and second layers of fluorinated polymer are the sole layers of fluorinated polymer, and said first layer is in adherent contact with said second layer.

18. The membrane of claim 1 or 17 wherein said hydrogen bubble release layer is a gas- and liquid-permeable porous non-electrode layer in adherent contact with the outer surface of said first layer.

19. The membrane of claim 2 or 17 wherein said hydrogen bubble release layer is a gas- and liquid-permeable porous non-electrode layer which comprises zirconium oxide and is in adherent contact with the outer surface of said first layer.

20. The membrane of claim 17 wherein said hydrogen bubble release layer is the outer surface of said first layer, having a roughness of 0.5 to 5 microns.

21. An electrochemical cell which comprises an anode compartment, an anode situated within said anode compartment, a cathode compartments, a cathode situated within said cathode compartment, and, between said compartments, the ion exchange membrane of claim 1, said membrane being disposed such that said first layer faces toward said cathode.

22. The electrochemical cell of claim 21 wherein the spacing between said anode and said cathode is no greater than about 3 mm.

23. The electrochemical cell of claim 23 wherein said membrane is in contact with at least one of said anode and said cathode.

24. The electrochemical cell of claim 23 wherein said membrane is in contact with both said anode and said cathode.

25. In an improved process for electrolysis of brine in a chloralkali cell which cell comprises an anode, an anode compartment, a cathode, a cathode compartment, and a fluorine-containing cation exchange memberane which separates said compartments, and which process consists essentially of introducing the brine into the anode compartment of the cell and causing a current to flow through the cell to form caustic and chlorine, the improvement which comprises employing as said membrane the ion exchange membrane of claim 1, said membrane being disposed such that said first layer faces toward the cathode.

26. The process of claim 25 wherein the spacing between said anode and said cathode is no greater than about 3 mm.

27. The process of claim 26 wherein said membrane is in contact with at least one of said anode and said cathode.

28. The process of claim 27 wherein said membrane is in contact with both said anode and said cathode.

29. In a reinforced fluorinated cation-exchange polymer membrane which is impermeable to hydraulic flow of liquid, said membrane comprising at least first and second layers of fluorinated polymers whose functional groups are —CFZ—COOM groups or —CFQ—SO$_3$M groups, where M is H, Na, K or NH$_4$, Z is F, CF$_3$ or CF$_2$Cl, and Q is F, Cl, C$_1$ to C$_{10}$ perfluoroalkyl or CF$_2$Cl, said layers when adjacent being in adherent contact with one another, said first layer being of polymer whose functional groups are —CFZ—COOM groups and said second layer being of polymer whose functional groups are —CFQ—SO$_3$M groups, the improvement wherein said membrane has sacrificial elements partially embedded in the outer surface of said second layer such that after removal of said sacrificial elements there are voids at the outer surface of said second layer characterized by a void volume of 5 to 40% and an open area of 15 to 100%, and wherein said membrane has reinforcement strands partially or completely embedded therein, and each said polymer with —CFZ—COOM groups has an equivalent weight of 670 to 1500 and each said polymer with —CFQ—SO$_3$M groups has an equivalent weight of 600 to 1500.

30. The membrane of claim 29 wherein said fluorinated polymer is perfluorinated polymer, each said polymer with —CFZ—COOM groups has an equivalent weight of 770 to 1250, and each said polymer with —CFQ—SO$_3$M groups has an equivalent weight of 900 to 1400.

31. The membrane of claim 30 wherein said sacrificial elements are polyester, polyamide, acrylic or cellulosic sacrificial yarns.

32. The membrane of claim 31 wherein Z is F, Q is F, said —CF$_2$—COOM functional groups are part of —(CF$_2$)$_m$—COOM moieties where m is 1, 2 or 3, and said —CF$_2$—SO$_3$M functional groups are part of —(CF$_2$)$_p$—SO$_3$M moieties where p is 2 or 3.

33. The membrane of claim 32 wherein, after removal of said sacrificial yarns, said void volume is 8 to 20%, and said open area is 50 to 90%.

34. The membrane of claim 33 wherein said reinforcement strands are reinforcement yarns of perfluorocarbon polymer.

35. The membrane of claim 34 wherein said reinforcement yarns are in the form of a first woven or knitted fabric, and said sacrificial yarns are in the form of a second woven or knitted fabric.

36. The membrane of claim 35 wherein said —(CF$_2$)$_m$—COOM moieties are part of —O—(CF$_2$)$_m$COOM moieties, and said —(CF$_2$)$_p$—SO$_3$M moieties are part of —O—(CF$_2$)$_p$—SO$_3$M moieties.

37. The membrane of claim 36 wherein said first and second layers of fluorinated polymer are the sole layers of fluorinated polymer, and said first layer is in adherent contact with said second layer.

38. The membrane of claim 37 wherein said membrane has a hydrogen bubble release layer at the outer surface of said first layer.

39. The membrane of claim 38 wherein said hydrogen bubble release layer is a gas- and liquid-permeable porous non-electrode layer in adherent contact with the outer surface of said first layer.

40. The membrane of claim 39 wherein said gas- and liquid-permeable porous non-electrode layer comprises zirconium oxide.

41. The membrane of claim 38 wherein said hydrogen bubble release layer is the outer surface of said first layer, having a roughness of 0.5 to 5 microns.

42. The membrane of claim 34 wherein said sacrificial yarns and said reinforcement yarns are in the form of one woven or knitted fabric.

43. The membrane of claim 42 wherein said —(CF$_2$)$_m$—COOM moieties are part of —O—(CF$_2$)$_m$COOM moieties, and said —(CF$_2$)$_p$—SO$_3$M moieties are part of —O—(CF$_2$)$_p$—SO$_3$M moieties.

44. The membrane of claim 43 wherein said first and second layers of fluorinated polymer are the sole layers of fluorinated polymer, and said first layer is in adherent contact with said second layer.

45. The membrane of claim 29 or 44 wherein said membrane has a hydrogen bubble release layer at the outer surface of said first layer.

46. The membrane of claim 30 or 44 wherein said membrane has a hydrogen bubble release layer which is a gas- and liquid-permeable porous non-electrode layer in adherent contact with the outer surface of said first layer.

47. The membrane of claim 45 wherein said hydrogen bubble release layer is a gas- and liquid-permeable porous non-electrode layer which comprises zirconium oxide and is in adherent contact with the outer surface of said first layer.

48. The membrane of claim 45 wherein said hydrogen bubble release layer is the outer surface of said first layer, having a roughness of 0.5 to 5 microns.

49. In a reinforced fluorinated polymer membrane which is impermeable to hydraulic flow of liquid, said membrane comprising at least first and second layers of fluorinated polymers whose functional groups are —CFZ—COOR groups or —CFQ—SO$_2$X groups, where R is lower alkyl, X is F or Cl, and Z is F, CF$_3$ or CF$_2$Cl, and Q is F, Cl, C$_1$ to C$_{10}$ perfluoroalkyl or CF$_2$Cl, said layers when adjacent being in adherent contact with one another, said first layer being of polymer whose functional groups are —CFZ—COOR groups and said second layer being of polymer whose functional groups are —CFQ—SO$_2$X groups, the improvement wherein said membrane has sacrificial elements partially embedded in the outer surface of said second layer such that after removal of said sacrificial elements there are voids at the outer surface of said second layer characterized by a void volume of 5 to 40% and an open area of 15 to 100%, and wherein said membrane has reinforcement strands partially or completely embedded therein, and each said polymer with —CFZ—COOR groups has an equivalent weight of 670 to 1500 and each said polymer with —CFQ—SO$_2$X groups has an equivalent weight of 600 to 1500.

50. The membrane of claim 49 wherein said fluorinated polymer is perfluorinated polymer, each said polymer with —CFZ—COOR groups has an equivalent weight of 770 to 1250, and each said polymer with —CFQ—SO$_2$X groups has an equivalent weight of 900 to 1400.

51. The membrane of claim 50 wherein said sacrificial elements are polyester, polyamide, acrylic or cellulosic sacrificial yarns, and said reinforcement strands are reinforcement yarns of perfluorocarbon polymer.

52. The membrane of claim 51 wherein Z is F, Q is F, said —CF$_2$—COOR functional groups are part of —(CF$_2$)$_m$—COOR moieties where m is 1, 2 or 3, and said —CF$_2$—SO$_2$X functional groups are part of —(CF$_2$)$_p$—SO$_2$X moieties where p is 2 or 3, and after removal of said sacrificial yarns, said void volume is 8 to 20%, and said open area is 50 to 90%.

53. The membrane of claim 52 wherein said —(CF$_2$)$_m$—COOR moieties are part of —O—(CF$_2$)$_m$COOR moieties, said —(CF$_2$)$_p$—SO$_2$X moieties are part of —O—(CF$_2$)$_p$—SO$_2$X moieties, said first and second layers of fluorinated polymer are the sole layers of fluorinated polymer, and said first layer is in adherent contact with said second layer.

54. The membrane of claim 49 or 53 wherein said membrane has a hydrogen bubble release layer at the outer surface of said first layer.

55. The membrane of claim 54 wherein said sacrificial yarns and said reinforcement yarns are in the form of one woven or knitted fabric.

56. The membrane of claim 54 wherein said reinforcement yarns are in the form of a first woven or knitted fabric, and said sacrificial yarns are in the form of a second woven or knitted fabric.

57. In a reinforced fluorinated polymer membrane which is impermeable to hydraulic flow of liquid, said membrane comprising at least first and second layers of fluorinated polymers whose functional groups are —CFZ—COOR groups or —CFQ—SO$_2$X groups, where R is lower alkyl, X is F or Cl, Z is F, CF$_3$ or CF$_2$Cl, and Q is F, Cl, C$_1$ to C$_{10}$ perfluoroalkyl or CF$_2$Cl, said layers when adjacent being in adherent contact with one another, said first layer being of polymer whose functional groups are —CFZ—COOR groups and said second layer being of polymer whose functional groups are —CFQ—SO$_2$X groups, the improvement wherein said membrane has voids at the outer surface of said second layer characterized by a void volume of 5 to 40% and an open area of 15 to 100%, and wherein said membrane has reinforcement strands partially or completely embedded therein, and each said polymer with —CFZ—COOR groups has an equivalent weight of 670 to 1500 and each said polymer with —CFQ—SO$_2$X groups has an equivalent weight of 600 to 1500.

* * * * *